(12) United States Patent
Navale et al.

(10) Patent No.: US 10,829,369 B2
(45) Date of Patent: Nov. 10, 2020

(54) SYSTEM FOR IMPROVED HYDROGEN DISTRIBUTION IN A METAL HYDRIDE REACTOR

(71) Applicant: THERMAX LIMITED, Maharashtra (IN)

(72) Inventors: Devadatta Pundlik Navale, Maharashtra (IN); Pandurang Jalindar Sathe, Maharashtra (IN)

(73) Assignee: THERMAX LIMITED, Maharashtra (IN)

( * ) Notice: Subject to any disclaimer, the term of this patent is extended or adjusted under 35 U.S.C. 154(b) by 83 days.

(21) Appl. No.: 15/543,491

(22) PCT Filed: Nov. 26, 2015

(86) PCT No.: PCT/IB2015/059147
§ 371 (c)(1),
(2) Date: Jul. 13, 2017

(87) PCT Pub. No.: WO2016/113610
PCT Pub. Date: Jul. 21, 2016

(65) Prior Publication Data
US 2018/0009660 A1     Jan. 11, 2018

(30) Foreign Application Priority Data
Jan. 14, 2015   (IN) .................. IN143/MUM/2015

(51) Int. Cl.
*C01B 3/00*      (2006.01)
*F25B 17/12*     (2006.01)
(Continued)

(52) U.S. Cl.
CPC .............. *C01B 3/0005* (2013.01); *B01J 4/001* (2013.01); *F17C 11/005* (2013.01); *F25B 17/12* (2013.01);
(Continued)

(58) Field of Classification Search
CPC .......... B01J 4/001; B01J 8/009; B01J 8/0278; C01B 3/0005; C01B 3/0084;
(Continued)

(56) References Cited

U.S. PATENT DOCUMENTS

| 3,793,144 A | 2/1974 | Magladry |
| 4,457,136 A | 7/1984 | Nishizaki et al. |

(Continued)

FOREIGN PATENT DOCUMENTS

| EP | 0093885 A2 | 11/1983 |
| WO | 03/031326 A1 | 4/2003 |

*Primary Examiner* — Anthony J Zimmer
*Assistant Examiner* — Syed T Iqbal
(74) *Attorney, Agent, or Firm* — Cowan, Liebowitz & Latman, P.C.; Mark Montague

(57) ABSTRACT

A system for distribution of hydrogen gas in a metal hydride reactor is disclosed. The system comprises a hydrogen distribution conduit positioned within a metal tube so as to define an annular space between the hydrogen distribution conduit and the outer metal tube. The hydrogen distribution conduit provides a flow passage for the hydrogen gas. A metal sponge matrix containing hydrogen-storing metal powder or hydrogen-storing alloy powder is filled in the annular space. The system provides a more uniform distribution of hydrogen across the particles of the hydrogen-storing metal/alloy powder, provides mechanical support to the hydrogen distribution conduit, improves the thermal conductivity of the powdered metal/alloy bed and reduces the size and production cost of the reactor.

8 Claims, 5 Drawing Sheets

(51) Int. Cl.
 *F17C 11/00* (2006.01)
 *F25B 33/00* (2006.01)
 *B01J 4/00* (2006.01)
 *B01J 8/02* (2006.01)
 *B01J 8/00* (2006.01)

(52) U.S. Cl.
 CPC ............... *F25B 33/00* (2013.01); *B01J 8/009* (2013.01); *B01J 8/0278* (2013.01); *Y02E 60/32* (2013.01)

(58) Field of Classification Search
 CPC ... C01B 3/0015; C01B 3/0021; C01B 3/0031; F17C 11/005; F17C 2201/0104; F17C 2201/056; F17C 2205/0142; F17C 2205/0146; F17C 2221/012; F17C 2223/0138; F17C 2250/0469; F17C 2250/0491; F17C 2260/021; F25B 17/12; F25B 33/00; Y02E 60/321; Y02E 60/324; H01M 4/383; H01M 10/345; B22F 2998/00; B22F 9/023; C22C 1/0491
 See application file for complete search history.

(56) References Cited

U.S. PATENT DOCUMENTS

| | | | | |
|---|---|---|---|---|
| 4,489,564 | A | * 12/1984 | Hausler | ................. C01B 3/0005 123/553 |
| 4,583,638 | A | * 4/1986 | Bernauer | .............. F17C 11/005 206/0.7 |
| 6,015,041 | A | * 1/2000 | Heung | ................. C01B 3/0005 206/70 |
| 7,318,520 | B2 | 1/2008 | Golben | |
| 2009/0107853 | A1 | * 4/2009 | Tan | ........................ B82Y 30/00 206/0.7 |

* cited by examiner

SYSTEM FOR IMPROVED HYDROGEN DISTRIBUTION IN A METAL HYDRIDE REACTOR

FIELD OF THE DISCLOSURE

The present disclosure relates to a metal hydride reactor. More particularly, the present disclosure relates to a system for providing improved distribution of hydrogen gas in a metal hydride reactor.

BACKGROUND

In a metal hydride reactor, metals or alloys react with hydrogen exothermically to form metal hydrides, and the metal hydrides reversibly release hydrogen gas endothermically. $LaNi_5H_x$, $MmNi_5H_x$, $MmCo_5H_x$, $FeTiH_x$, $VNbH_x$ and $Mg_2CuH$ are common examples of metal hydrides which have the ability to occlude a significant amount of hydrogen and release a large amount of the heat of reaction. Various metal hydride devices are known, such as heat pumps and air conditioning devices, which utilize these properties of the metal hydrides to provide heating and/or refrigeration. In these metal hydride devices, hydrogen is used as a refrigerant and metal hydrides are used as absorbents.

Conventional metal hydride reactors have a shell-and-tube type heat exchanger having metal hydride powder on the shell side and heat transfer fluid on the tube side. In conventional metal hydride reactors, hydrogen gas is not homogenously distributed across the bed of the hydrogen storing metal/alloy powder, thereby lowering the rate of hydrogen sorption by the metal/alloy powder. This adversely affects the efficiency of the reactor.

Sintered tubes have been conventionally used for the distribution of hydrogen gas. U.S. Pat. No. 4,457,136 suggests one such metal hydride reactor which comprises sintered tubes for the distribution of hydrogen gas. These tubes, due to their size and thickness, restrain miniaturization of the reactor and this limits the overall performance of the system. The diameter of the reactor tube is inversely proportional to its heat and mass transfer capability, thus a larger diameter tube results in larger reactor size and reduced performance. Due to the limitations in the sintering process, sintered tubes typically have a minimum diameter of 4 to 6 mm. This limits a reactor tube diameter to a minimum of 10 to 16 mm. Nonetheless, for better performance of a metal hydride reactor, metal tubes of 3 to 6 mm diameter and hydrogen distribution tubes of 1 to 3 mm diameter are desirable, which are difficult to manufacture with the typical sintering processes.

Also, sintered tubes require a minimum thickness, which brings about a limitation in the weight reduction of the reactor, which in turn, adversely affects the performance of the metal hydride reactor. The raw materials required for making sintered tubes and for the sintering process are expensive, thereby increasing the cost of the metal hydride reactor, as a large number of reactors may be required for hydrogen storage and heat pump applications, depending on the capacity of a system.

European Patent Application EP0093885 suggests a marginal improvement over the conventional sintered tubes by way of a small diameter hydrogen distribution tube made of a metallic wire mesh, of wire diameter up to 0.04 mm. However, EP0093885 fails to address the instability of a small diameter tube with wire mesh having wire diameter this small. The tube disclosed in EP0093885 has a small mesh wire diameter and is clamped only at one end while hanging freely at the other, resulting in a tube that lacks firmness. This may result in a sagging tube that cannot withstand expansions and contractions occurring over the thousands of operating cycles. Such tubes are often susceptible to deformations, denting, and/or bending, thereby, disrupting the balanced distribution of metal hydride powder around it, and hence, adversely affecting the performance of the system.

Also, a wire mesh tube of the desired length, with such small wire diameter and tube thickness, is inherently bound to sag or become curved, and therefore, such a tube will not stay straight and properly centered if it is being held at just one end.

Furthermore, in conventional metal hydride reactors, the effective thermal conductivity of the metal/alloy powder bed is low, typically in the range 0.1-0.5 W/m-K. Higher values of effective bed thermal conductivity of hydrogen storing metal/alloys is desirable for better performance. Low thermal conductivity of metal/alloy powder bed results in poor heat and mass transfer, which in turn, increases metal/alloy powder material requirement, the size of the reactor and the cost of the reactor, besides reducing system performance.

Hence, there is a need for a system for improved distribution of hydrogen gas in metal hydride reactors that overcomes the above-noted drawbacks of conventional metal hydride reactors, in order to improve the performance and mechanical stability, and reduce the cost related problems thereof.

Objects

Some of the objects of the system of the present disclosure, which at least one embodiment herein satisfies, are as follows:

An object of the present disclosure is to provide a system that improves the distribution of hydrogen gas in a metal hydride reactor.

Another object of the present disclosure is to provide a system for improved distribution of hydrogen gas in a metal hydride reactor comprising a hydrogen distribution conduit which maintains its position and shape against the contractions and expansions occurring during the operating cycles.

Still another object of the present disclosure is to provide a system for improved distribution of hydrogen gas in a metal hydride reactor that reduces the overall size of the reactor.

Yet another object of the present disclosure is to provide a system for improved distribution of hydrogen gas in a metal hydride reactor which improves the thermal conductivity of the powdered metal/alloy bed, and reduces the production cost of the reactor.

Other objects and advantages of the present disclosure will be more apparent from the following description when read in conjunction with the accompanying figures, which are not intended to limit the scope of the present disclosure.

SUMMARY

In accordance with the present disclosure, there is provided a system for distribution of hydrogen gas in a metal hydride reactor, said system comprising:
a metal tube;
a hydrogen distribution conduit, positioned within the metal tube and defining an annular space between the hydrogen distribution conduit and the outer metal tube, the hydrogen distribution conduit being adapted to provide a flow passage for the hydrogen gas therethrough; and a metal sponge matrix occupying the annular space, the metal sponge matrix being adapted to contain a hydrogen-storing metal powder or a hydrogen storing alloy powder.

Typically, the hydrogen distribution conduit is a metal wire mesh conduit. The metal for the metal wire mesh conduit can be selected from stainless steel, copper or copper alloy.

Furthermore, the metal sponge matrix can be made of a thermally conductive metal selected from copper, copper alloy, aluminum or carbon.

The hydrogen distribution conduit can be centrally positioned within the metal tube and can extend along the operative length of the metal tube.

The hydrogen distribution conduit is configured to allow the flow of hydrogen gas into it from the metal sponge during a desorption cycle and out of it to the metal sponge during an absorption cycle, by regulation of the pressure inside the conduit with respect to the pressure outside the conduit. Furthermore, the hydrogen distribution conduit has a mesh pore size that is small enough to prevent the entry of the hydrogen-storing metal powder or the hydrogen-storing alloy powder into the hydrogen distribution conduit. The mesh pore size is typically in the range 2-5 microns.

Connectors can be provided at operative ends of the hydrogen distribution conduit.

BRIEF DESCRIPTION OF THE ACCOMPANYING DRAWING

The system for distribution of hydrogen gas in a metal hydride reactor of the present disclosure will now be described with the help of the accompanying drawing, in which:

FIG. 4 (*b*) illustrates a cross-section of the system for distribution of hydrogen gas;

DETAILED DESCRIPTION

A system and a method of the present disclosure will now be described with reference to the embodiments which do not limit the scope and ambit of the disclosure.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 4A:
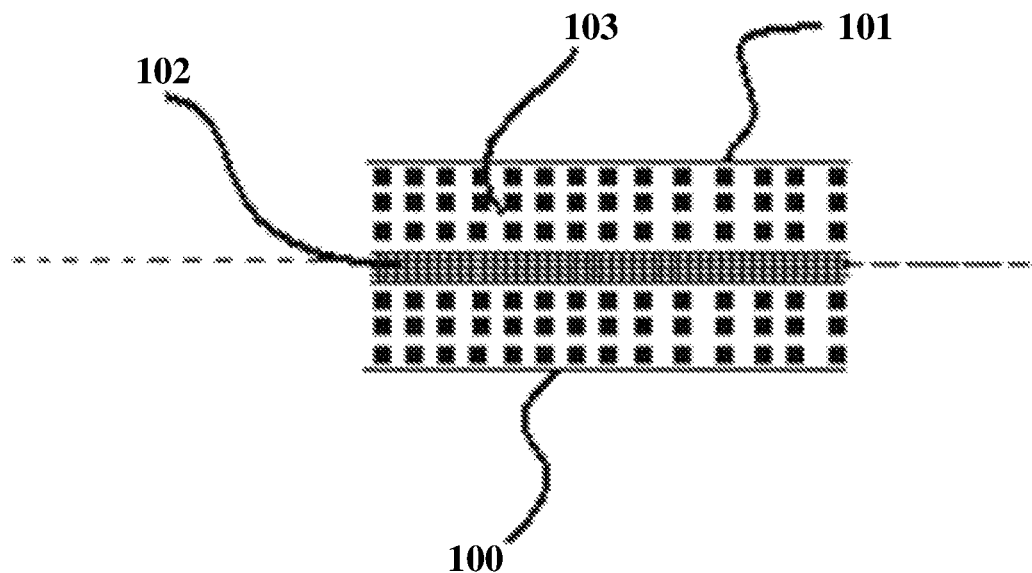
FIG. 4 (*a*) illustrates an axial-section of the system for distribution of hydrogen gas.
Figure 4B:
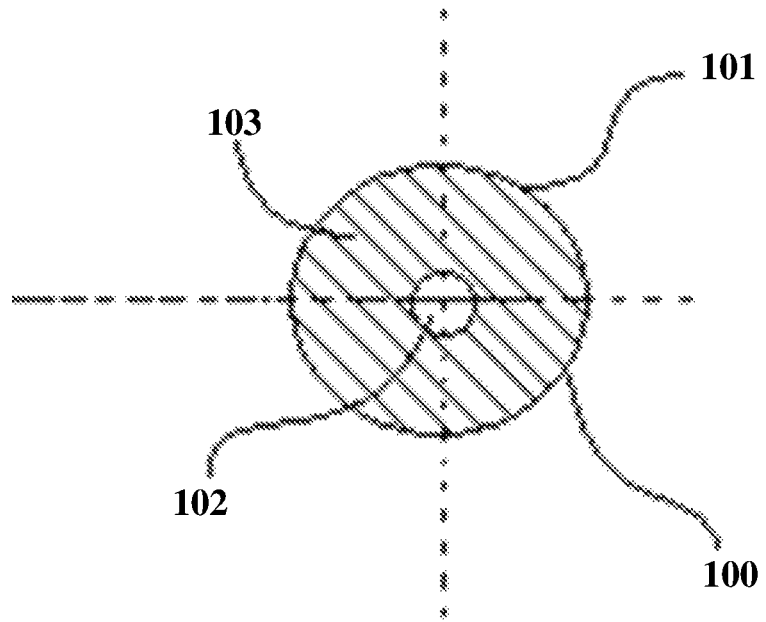

The system of the present disclosure provides improved distribution of hydrogen gas in a metal hydride reactor, to enhance the overall performance of a hydrogen storage system. The assembly of the hydrogen distribution system 100 of the present disclosure in the metal hydride reactor 109 is illustrated in the FIG. 1. The system 100 comprises a hydrogen distribution conduit 102 ensconced inside an outer metal tube 101, so as to define an annular space therebetween. A metallic sponge matrix 103, as shown in FIGS. 4(*a*) & 4(*b*), occupies the annular space between the outer metal tube 101 and the hydrogen distribution conduit 102. The sponge matrix 103 holds a sized hydrogen-storing metal or alloy powder and the hydrogen distribution conduit 102 provides a flow passage for the hydrogen gas. The hydrogen-storing metal/alloy powder is uniformly distributed in the metal sponge matrix 103 by tapping and vibration. The metal sponge matrix 103 improves the thermal conductivity of the metal/alloy powder bed.

The hydrogen distribution conduit 102 has a reduced thickness and diameter, thus the overall reactor size is reduced. This is achieved by using a thin metal wire mesh for the hydrogen distribution conduit 102 instead of a sintered tube. To overcome the problem of sagging of the hydrogen distribution conduit 102, mechanical supports are provided to the conduit 102 that help in maintaining the position and shape of the conduit 102 against contractions and expansions caused during the operating cycles.

The hydrogen distribution conduit 102 can be centrally disposed inside the outer metal tube 101 and can extend along the operative length of the metal tube 101 and the metal sponge matrix 103. The hydrogen distribution conduit 102 is such that it allows hydrogen gas to flow into it from the metal sponge during a desorption cycle and out of it to the metal sponge during an absorption cycle, but does not allow the hydrogen-storing metal or alloy powder to pass through it.

The hydrogen distribution conduit 102 is made of metal wire mesh, preferably stainless steel wire mesh. Alternatively, copper or a copper alloy wire mesh may also be used. The mesh pore size of the hydrogen distribution conduit 102 allows the hydrogen gas to flow through it, but the metal/alloy powder particles are prevented from passing therethrough. The metal sponge matrix 103 is preferably made of copper or a copper alloy. It may also be of aluminum, carbon or any other conductive material. The contact between the hydrogen distribution conduit 102 and the metal sponge matrix 103 of the system 100 is such that it provides for optimal hydrogen flow between them. The hydrogen distribution conduit 102 can extend along the entire length of the outer tube 101 and the sponge matrix 103, ensuring uniform distribution of the hydrogen gas to the metal/alloy powder particles stored in the metal sponge matrix 103. FIG. 4 (*a*) shows an axial-section and FIG. 4(*b*) shows a cross-section of the system 100 for distribution of hydrogen gas.

The present disclosure overcomes the limitations in miniaturization of the size and the thickness of the hydrogen distribution tubes by means of the metal wire mesh hydrogen distribution conduit 102. Hydrogen distribution conduits with a diameter of about (but not limited to) 1-3 mm may be fabricated using a metallic wire mesh, with mesh pore size of about (but not limited to) 2-5 microns. The mesh can be made from very fine wires of up to 0.015 mm wire diameter and about 0.05 mm to 0.2 mm thickness. This overcomes the problem with regard to the limitation in reduction of thickness of the conduits and the overall weight of the reactor.

The fabrication of the hydrogen distribution conduit 102 using the wire mesh includes the following steps: cutting the mesh to a size 5% greater than the perimeter of the required size and of the required length; rolling the cut mesh to the required diameter, with a slight overlap (at least 0.1 mm); and sealing the outside end of the conduit longitudinally by laser welding.

Proper centering of the hydrogen distribution conduit 102 inside the metal tube 101 is achieved by tightly wrapping the metal sponge matrix 103 around the hydrogen distribution conduit 102. This assembly of the hydrogen distribution conduit 102 and the metal sponge matrix 103 is then inserted inside the outer metal tube 101. The outer diameter of the sponge and the hydrogen distribution conduit assembly is approximately close to the inner diameter of the metal tube. This not only achieves the centering of the hydrogen distribution conduit within the metal tube, but also ensures mechanical support, for holding the hydrogen distribution conduit firmly fixed at the contact points between the hydrogen distribution conduit and the metal sponge.

Figure 1:
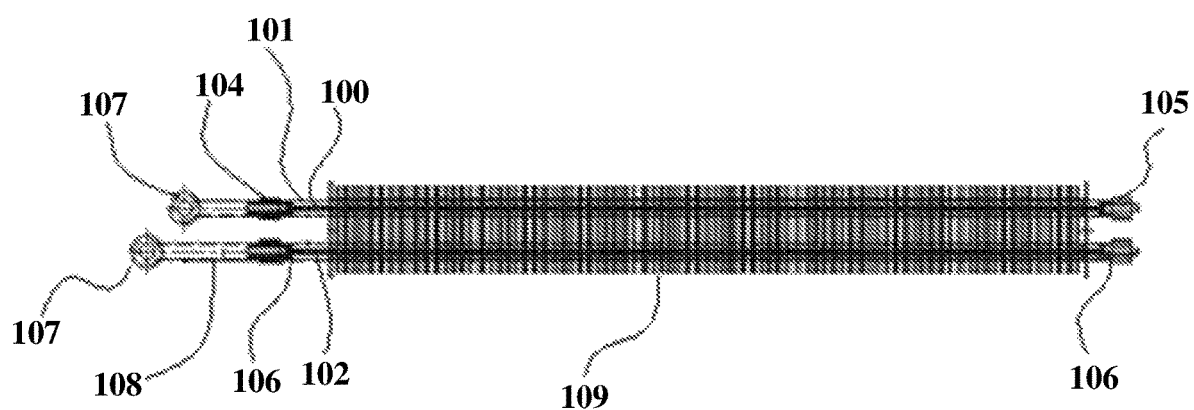
FIG. 1 illustrates an assembly of the system for distribution of hydrogen gas in a metal hydride reactor.
Figure 2:
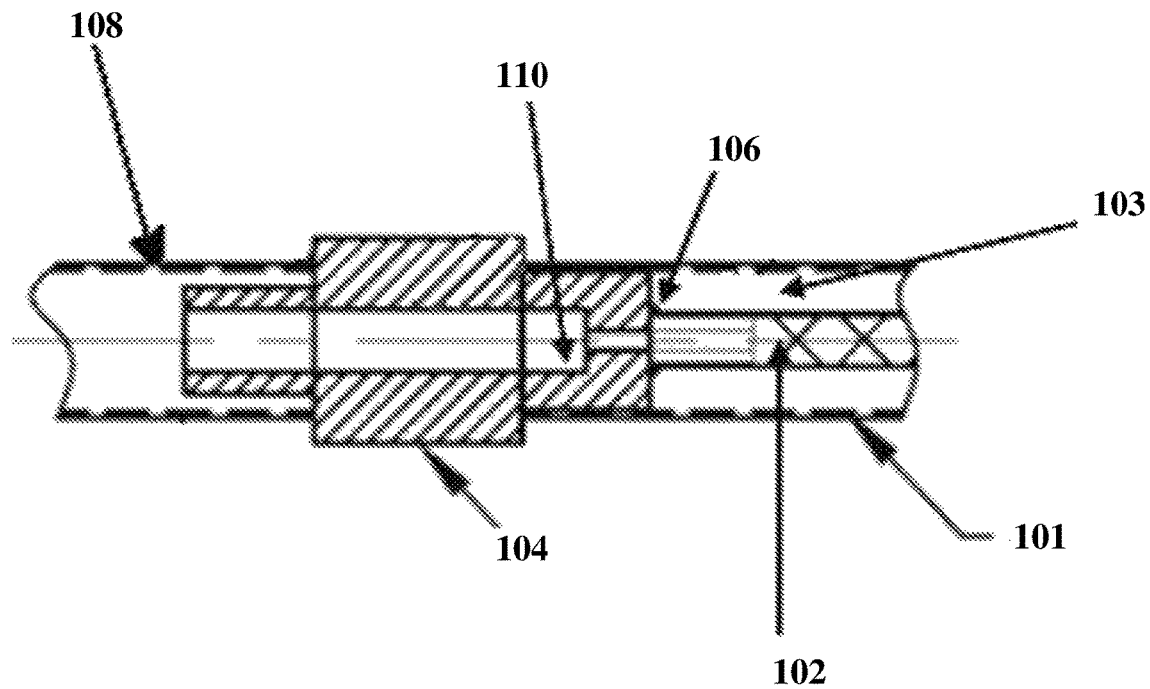
FIG. 2 illustrates the connection between the hydrogen flow passage, the header side connector and the hydrogen distribution conduit.
Figure 3:
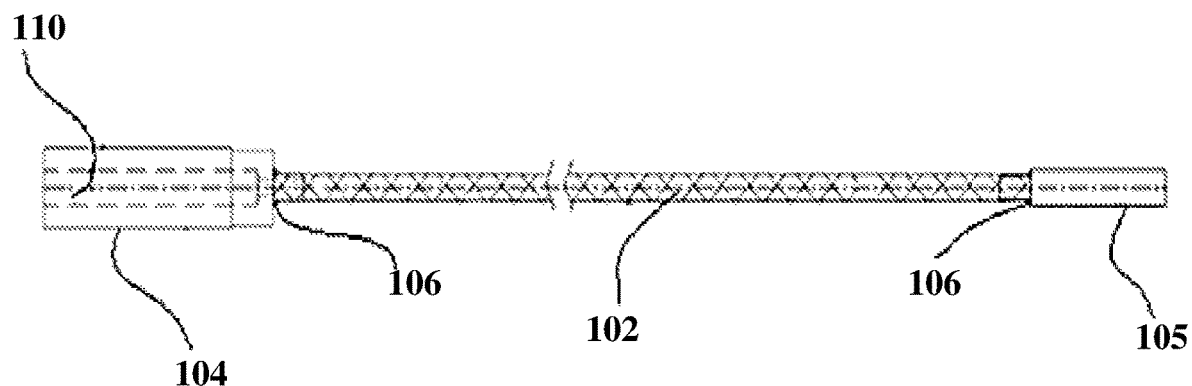
FIG. 3 illustrates the hydrogen passage into the hydrogen distribution conduit.
Figure 5:
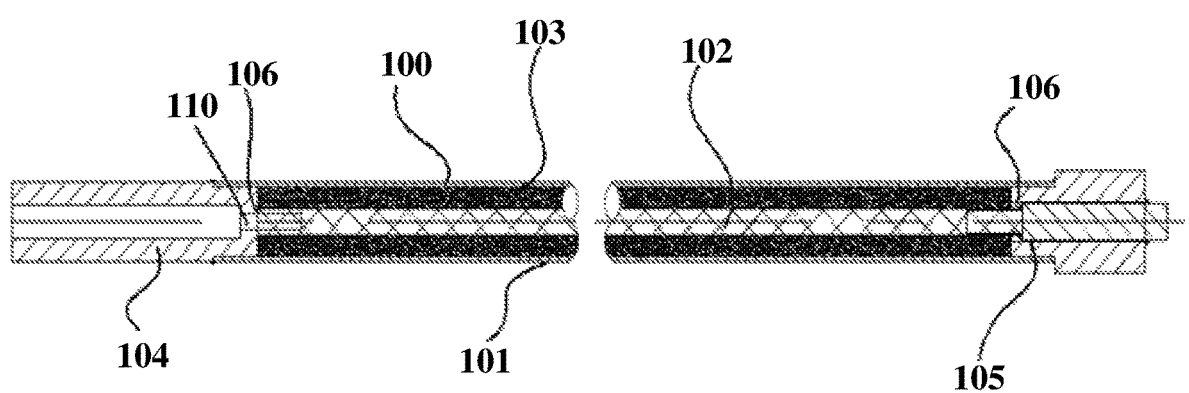
FIG. 5 illustrates a sectional diagram of the end-to-end connection of the system for distribution of hydrogen gas.

The hydrogen distribution conduit is provided with connectors at each of its operative ends. FIGS. 1, 2, 3 & 5 illustrate the connectors (104 & 105) provided at the operative ends of the hydrogen distribution conduit 102. The hydrogen distribution conduit 102 is connected to a header side connector 104 at one end and a blank connector 105 at the other end, by means of welds 106. The header 107 (shown in FIG. 1) is connected to the header side connector 104 by a metal tube 108. The assembly of the hydrogen distribution system 100 in the metal hydride reactor 109 is shown in FIG. 1. The header side connector 104 provides hydrogen flow passage 110 for the hydrogen gas. FIG. 2 illustrates the connection between the hydrogen flow passage 110, the header side connector 104 and the hydrogen distribution conduit 102. FIG. 3 illustrates the hydrogen flow passage 110 into the hydrogen distribution conduit 102. FIG. 5 illustrates a sectional diagram of the end-to-end connection of the system 100 for distribution of hydrogen gas. Together, the header side connector 104, the blank connector 105 and the metal sponge matrix 103 hold the thin wire mesh hydrogen distribution conduit 102 firmly fixed at its central position and help in maintaining its original shape without any significant deformation, against the expansions and contractions that it may undergo during the operating cycles.

The system 100 is assembled by attaching the header side connector 104 and the blank connector 105 to the hydrogen distribution conduit 102 by laser welding, and tightly wrapping the metal sponge matrix 103 around the conduit 102. The assembly of the conduit 102 and the metal sponge matrix 103 is placed inside the metal tube 101.

Figure 6:
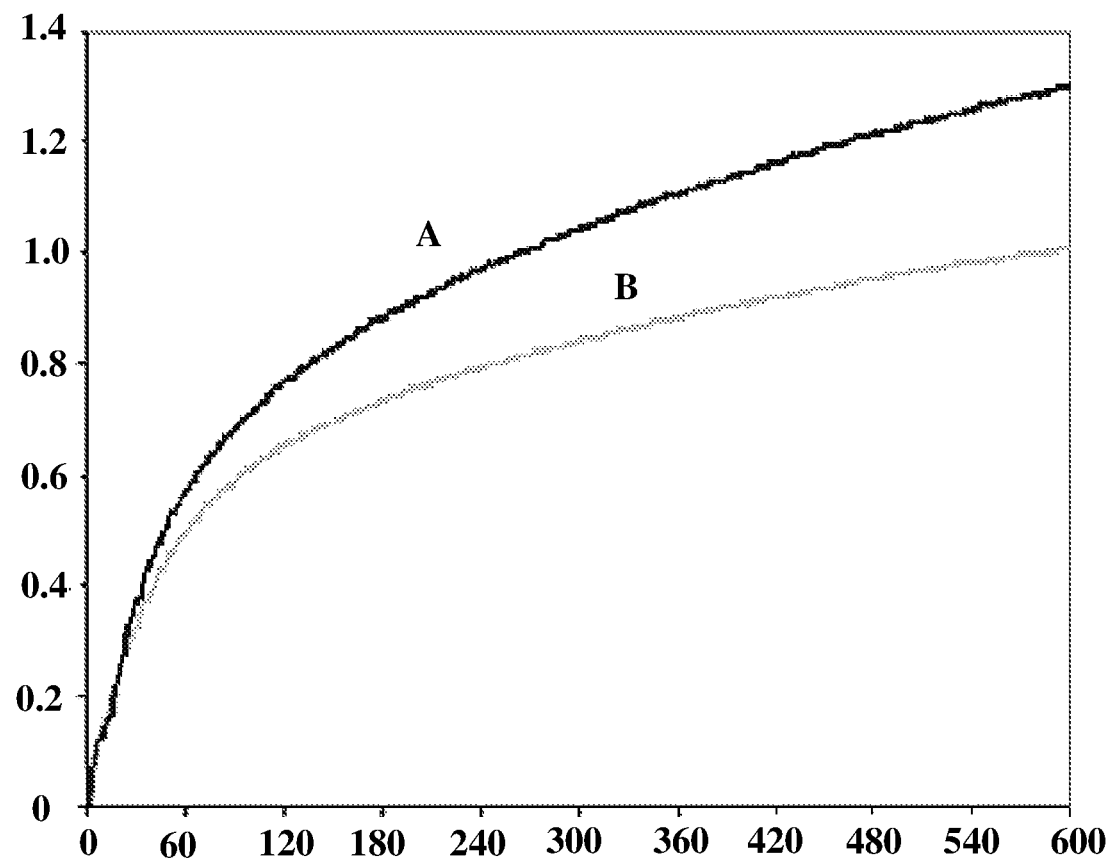
FIG. 6 illustrates the performance of the system for distribution of hydrogen gas of the present disclosure in comparison with a conventional hydrogen distribution system.

The system 100 of the present disclosure provides a better distribution of hydrogen gas across the metal/alloy powder filled in the metal sponge matrix 103 as compared to a conventional system. FIG. 6 illustrates the improved performance of the system 100 of the present disclosure in comparison with a conventional hydrogen distribution system, at constant temperature; wherein x-axis represents the time in seconds; y-axis represents the hydrogen absorbed in weight %; line 'A' depicts the performance of hydrogen distribution system according to the present disclosure, and line 'B' depicts the performance of a conventional hydrogen distribution system. The performance of the system of the present disclosure shows improvement because the packing density of the powder bed in the sponge matrix 103 is less than that of a conventional bed of freely dispersed metal/alloy powder, which is not confined to any matrix. The sponge matrix 103 provides a more uniform distribution of void fraction. This increased uniformity in the void fraction provides additional flow passage/space for the hydrogen gas to flow uniformly to the powdered metal/alloy particles throughout the sponge. Hence, there is a more homogenous admixture of the hydrogen gas and the hydrogen storing metal/alloy particles throughout the reaction area of the metal hydride reactor, resulting in improved rate of sorption of hydrogen gas by the metal/alloy particles. The system of the present disclosure also requires less quantities of the hydrogen storing metal/alloy powder, and thereby reduces the cost of production of the reactor 109.

As the flow passage for hydrogen is increased due to increased void fraction in the metal/alloy bed in the sponge matrix, the pressure drop for the hydrogen flow from the hydrogen distribution conduit to the metal hydride bed is decreased and vice versa. A lower pressure drop for hydrogen flow is highly desirable for system operation, resulting in better performance of the metal hydride reactor in hydrogen storage systems in general, and heat pump systems in particular.

The limitation of having poor bed thermal conductivity is also addressed by the hydrogen distribution system of the present disclosure. The metal sponge matrix is preferably made of copper or copper alloy, which increases the effective thermal conductivity and improves heat transfer in the system. Improved heat transfer to the metal/alloy bed improves the performance of the reactor, and decreases the metal/alloy powder requirement, besides reducing the size and the cost of the reactor.

Technical Advancement

The system for improved distribution of hydrogen gas in a metal hydride reactor, as described in the present disclosure, has several technical advantages including, but not limited to, the realization of:
 a) improved distribution of hydrogen through out the hydrogen storing metal/alloy powder particles;
 b) improved mechanical support for the hydrogen distribution conduit so that it maintains its position and shape against the contractions and expansions occurring during the operation cycles;
 c) improved thermal conductivity of the powdered metal/alloy bed;
 d) reduction in the production cost of the reactor; and
 e) reduction in the overall reactor size.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system for distribution of hydrogen gas in a metal hydride reactor, said system comprising:
    a metal tube;
    a hydrogen distribution conduit positioned within said metal tube defining an annular space between said hydrogen distribution conduit and said metal tube, said hydrogen distribution conduit being adapted to provide a flow passage for the hydrogen gas therethrough, wherein said hydrogen distribution conduit is a metal wire mesh conduit;
    wherein said hydrogen distribution conduit has a mesh pore size configured to prevent entry of said hydrogen-storing metal powder or said hydrogen-storing alloy powder into said hydrogen distribution conduit;
    wherein operative ends of said hydrogen distribution conduit are provided with connectors, said connectors coaxially fixed to operative ends of said hydrogen distribution conduit; and
    a metal sponge matrix occupying said annular space, said metal sponge matrix being adapted to contain a hydrogen-storing metal powder or a hydrogen-storing alloy powder.

2. The system for distribution of hydrogen gas in a metal hydride reactor as claimed in claim 1, wherein said metal wire mesh conduit is made of at least one metal selected from stainless steel, copper and copper alloy.

3. The system for distribution of hydrogen gas in a metal hydride reactor as claimed in claim 1, wherein said metal sponge matrix is made of a thermally conductive metal selected from copper, copper alloy, aluminum or carbon.

4. The system for distribution of hydrogen gas in a metal hydride reactor as claimed in claim 1, wherein said hydrogen distribution conduit is centrally positioned within said metal tube and extends along the operative length of said metal tube.

5. The system for distribution of hydrogen gas in a metal hydride reactor as claimed in claim 1, wherein hydrogen distribution conduit is configured to allow flow of hydrogen gas into it from said metal sponge during a desorption cycle and out of it to said metal sponge during an absorption cycle, by regulation of pressure inside it with respect to the pressure outside it.

6. The system for distribution of hydrogen gas in a metal hydride reactor as claimed in claim 1, wherein said mesh pore size is in the range 2-5 microns.

7. The system for distribution of hydrogen gas in a metal hydride reactor as claimed in claim 1, wherein said metal wire mesh conduit is made of metal wire mesh, by forming metal wire mesh into to a wire mesh tub with a certain diameter.

8. The system for distribution of hydrogen gas in a metal hydride reactor as claimed in claim 1, wherein said connectors are fixed to the operative ends of said hydrogen distribution conduit by welding.

* * * * *